Jan. 13, 1970   J. W. RABA   3,488,866
INTERMEDIATE DIRECTIONAL ATTACK READING MACHINE
Filed Dec. 18, 1967   6 Sheets-Sheet 4

INVENTOR.
JOSEPH W. RABA
ATTORNEY

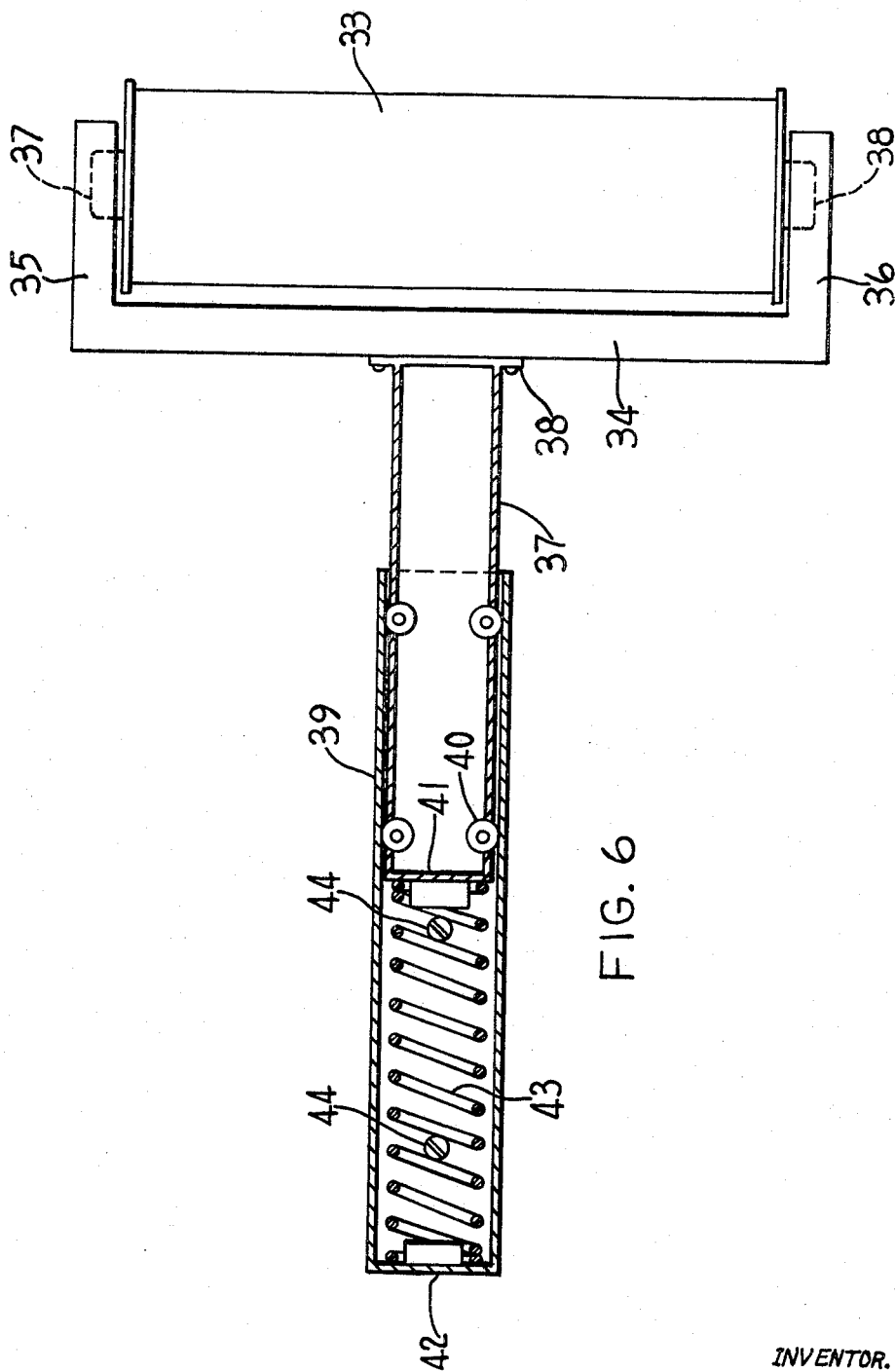

United States Patent Office 3,488,866
Patented Jan. 13, 1970

3,488,866
INTERMEDIATE DIRECTIONAL ATTACK READING MACHINE
Joseph W. Raba, 30 Peachtree Lane,
Huntington Station, N.Y. 11746
Filed Dec. 18, 1967, Ser. No. 691,285
Int. Cl. G09b 17/04
U.S. Cl. 35—35                                   2 Claims

ABSTRACT OF THE DISCLOSURE

A machine for controlled reading involving side-to-side presentation of material at predetermined rates comprises a panel on which a book may be placed. Rollers move an endless tape over the page to be read. The tape has a series of alternating transparent and opaque portions, the transparent portion having at least the dimensions of the printed matter on the page. As each opaque portion moves from left to right over the page, the reader must read at the speed at which each line is successively uncovered.

BACKGROUND OF THE INVENTION

The present invention is directed to controlled reading involving the left-to-right presentation of reading material at predetermined rates, and to providing a way of directly training functional visual skills and directional attack. The uncovering of reading material at a timed rate measures and improves the ability to perceive correctly, remember well, and to understand and interpret rapidly and in an organized manner.

In the Raba Patent 3,328,898, a directional attack reading machine is described for use by elementary pupils, say in the first to third grades. The book to be read is mounted on a platform, and an endless strip is passed over the page of the book read, the strip having stepped opaque and transparent areas of step length and height adequate to cover sequentially each line of the page being read.

Reading pacers for readers in the intermediate grades now are in demand. A few have appeared on the market, but they have a number of handicaps. For example, one unit uses either a strip of light, or a shade strip, which gradually drops vertically on or below the line read, to enable the reader to keep ahead of the pacer in order to read. Unfortunately, a person does not read vertically, but from left to right (in most countries).

It has been found that the eye includes from a single letter to 2½ words per fixation, and takes about 0.25 second, on the average, to process this visual image. Thus, the reading is done in jerky (saccadic) eye movements from the left to the right of the page. All readers make some regressions, i.e., they look back at a word that already has been read. Poor readers may spend as much as from 20% to 30% of their reading time reprocessing a visual image previously read, or making regressions. These regressions are an involuntary eye movement and do not include regressions when a person deliberately rereads to check on the thought content of the material being read.

SUMMARY OF THE INVENTION

According to the present invention, a directional attack reading machine is provided for readers in the intermediate grades (say, the fourth to sixth grades). A vertical mounting panel has a book base on its front surface, on which an open book may be placed for reading. On one side of the panel a fixed vertical roller is mounted. At the other side of the panel another similar roller is mounted in laterally spring-loaded relation. The rollers serve to rotate a thus-tensioned endless tape which rotates laterally around the mounting panel, with the book disposed under the forward portion of the tape.

A secondary mounting panel is attached at right angles to the back and below the middle of the vertical panel, and drawer-type slides are mounted under the latter panel with the slide ends projecting through the vertical panel and under the book base. A lateral support having a handle, is attached over the projecting ends of the slides and in front of the book base. Two vertical tape guides have their bottoms mounted on the support inside the tape and near the inner portions of the rollers so that when the handle is pulled, the guides will pull the forward tape portion against the spring loading to provide adequate space behind the tape for insertion of an open book. The support has a sliding opaque panel for covering the page of the book not being read, and a motor, mounted under the secondary panel, serves to drive the fixed roller through a gear train.

The tape has the height of the reading material and it is provided with a series of alternating transparent and opaque portions, the transparent portion having the dimensions of the printed matter being read on the page. As each opaque portion moves from left to right over the page, the reader must read at the speed at which each line is successively uncovered thereby.

BRIEF DESCRIPTION OF THE DRAWINGS

The invention will be more readily understood by reference to the accompanying drawings, in which:

FIGURE 6 presents a front view, partly in cross-section, of the spring loaded tape roller, and its spring loading connection.

The same numerals refer to similar parts in the various figures.

DESCRIPTION OF THE PREFERRED EMBODIMENT

Figure 1:
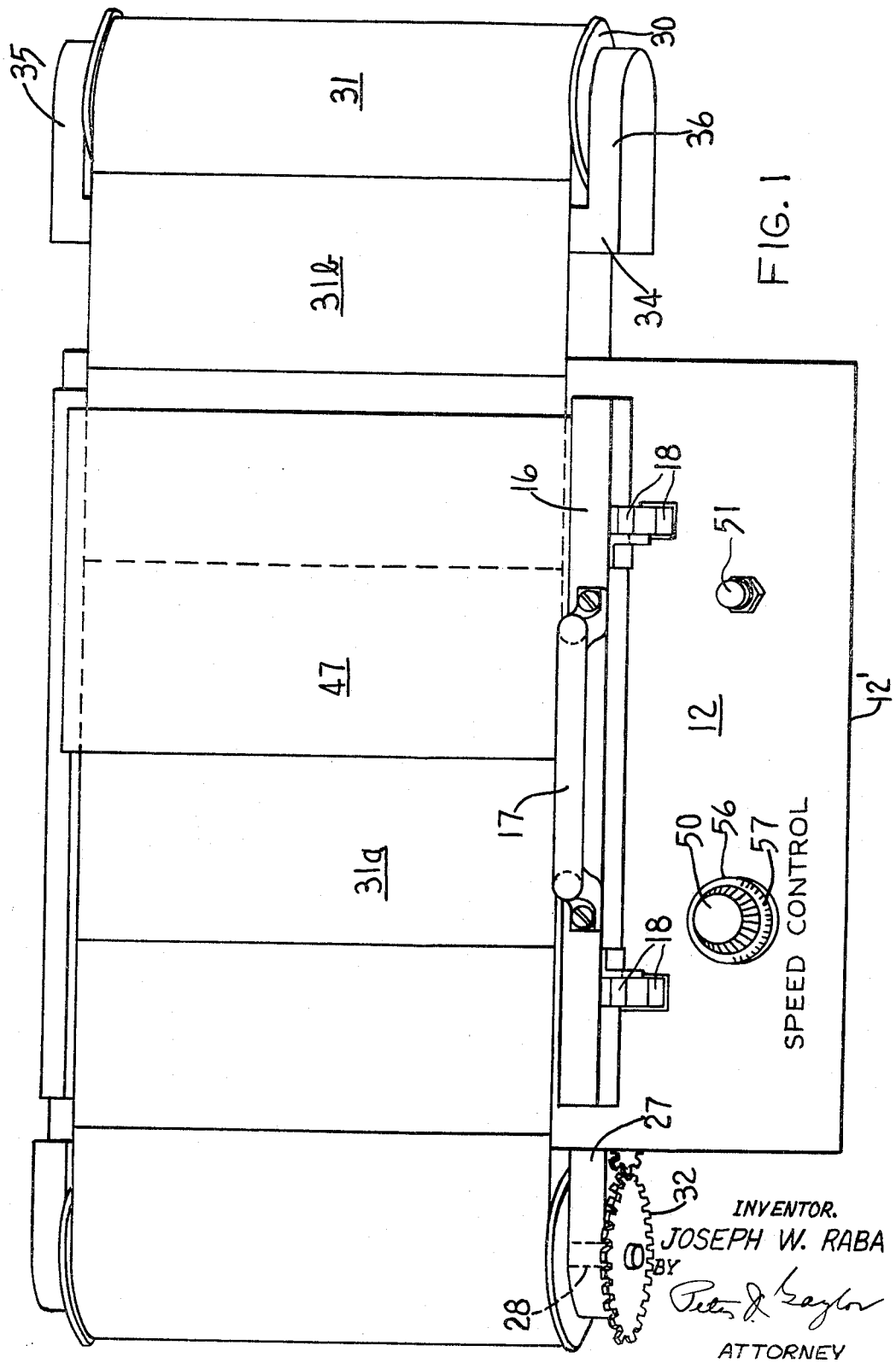
FIGURE 1 depicts a front elevational view of a preferred embodiment of the invention.

Referring to the drawings, numeral 10 represents a book base on which a book 11 may be set in open position. Base 10 is attached to vertically-directed mounting panel 12, against the front surface of which the book rests. The bottom 12' of the panel serves as a partial base for resting the unit on a table 13, for example. Attached to the rear surface of panel 12, oppositely disposed from base 10, and extending rearwardly, is secondary base 14, onto the bottom of which motor 15 is mounted.

Disposed in front of book base 10 is support 16, the forward portion of which is provided with a pull knob or handle 17. The bottom of support 16 is connected to conventional drawer type sliders consisting of an inner slider 18 which telescopically slides in conventional rectangular drawer slide mounting 19. The upper side of the latter is screwed onto the lower surface of base 14 by screws 20. Slide 18 has mounted thereon rollers 21 to reduce sliding friction. Slide 18 extends through hole 22 in panel 12. Sides 23 and 24 extending downwardly from base 14, serve as sides for the base, and, due to their angular bottoms 25, they provide a backward tilt for the unit, so as to make the book reading more comfortable.

Roller bracket 26, attached to panel 12, and oppositely-disposed lower roller bracket 27, attached to base 16, serve to house the bearings 28 of stationary-mounted tape roller 29 which is provided with terminal fins 30 to prevent sliding off of endless tape 31 which passes thereover. The shaft of motor 15 is connected to gear train 32 for rotating roller 29.

The other tape roller 33 is in spring-loaded arrangement, as is apparent from FIG. 6. Yoke 34 has brackets 35 and 36, which latter provide bearings 37 and 38 for the shaft of roller 33. Yoke 34 is connected to a rectangular frictionless slider of the conventional drawer slider type, which consists of a partially open rectangular sleeve 37 attached to yoke 34 at 38, and sliding telescopically in larger sleeve 39. Rollers 40 mounted in sleeve 37 tend to reduce friction and facilitate movement of sleeve 37 in sleeve 39. Both sleeves 37 and 39 have closed free ends 41 and 42, respectively, and a coiled spring 43, disposed between ends 41 and 42, serves to impress a thrust tending to hold roller 33 in extended position. Sleeve 39 is attached to the rear surface of panel 12 by screws 44.

Endless tape 31 is mounted tightly between rollers 29 and 33. Idler rollers 45 and 46 are mounted on book base 16. They serve to hold the tape 31 back when handle 17 is pulled for replacing book 11. Since they have little purpose during the actual use of the unit, it is not necessary to provide an upper bearing for them. In fact, they may be pegs, supports or guides, having the height of the tape 31.

A colored or translucent panel 47 is used to cover the book page which is not used. Its bottom end 48 rides in groove 49 in support 16, so as to enable sliding the panel from one side to the other.

Tape 31 is replaceable, and it has alternating transparent portions 31a and colored or opaque portions 31b, having the height of the printed page being read.

The width of the transparent portion is substantially equal to the width of the printed matter on the page. For the initial training program, the tape desirably has transparent and opaque portions of equal width. Because of the wide range of individual differences among students, however, and the fact that the present machine serves a dual purpose, viz, as a pacer for increasing the rate of comprehension, and as a means to prevent regression, the width of the opaque section may be variable. For example, it could range from a small fraction of the width of the printed portion, say about ¼" in width, to the width of the page. This allows more flexibility in the use of the machine, particularly with respect to the return sweep. The return sweep is the eye movement from the end of the line at the right hand side of the page, to the beginning of the next line on the left side of the page.

The tape preferably is made of plastic film sold on the market as "Mylar" film. A speed control 50 is provided to adjust the speed of the motor 15 which drives the tape.

A start-stop switch 51 also is provided for motor 15.

Figure 2:
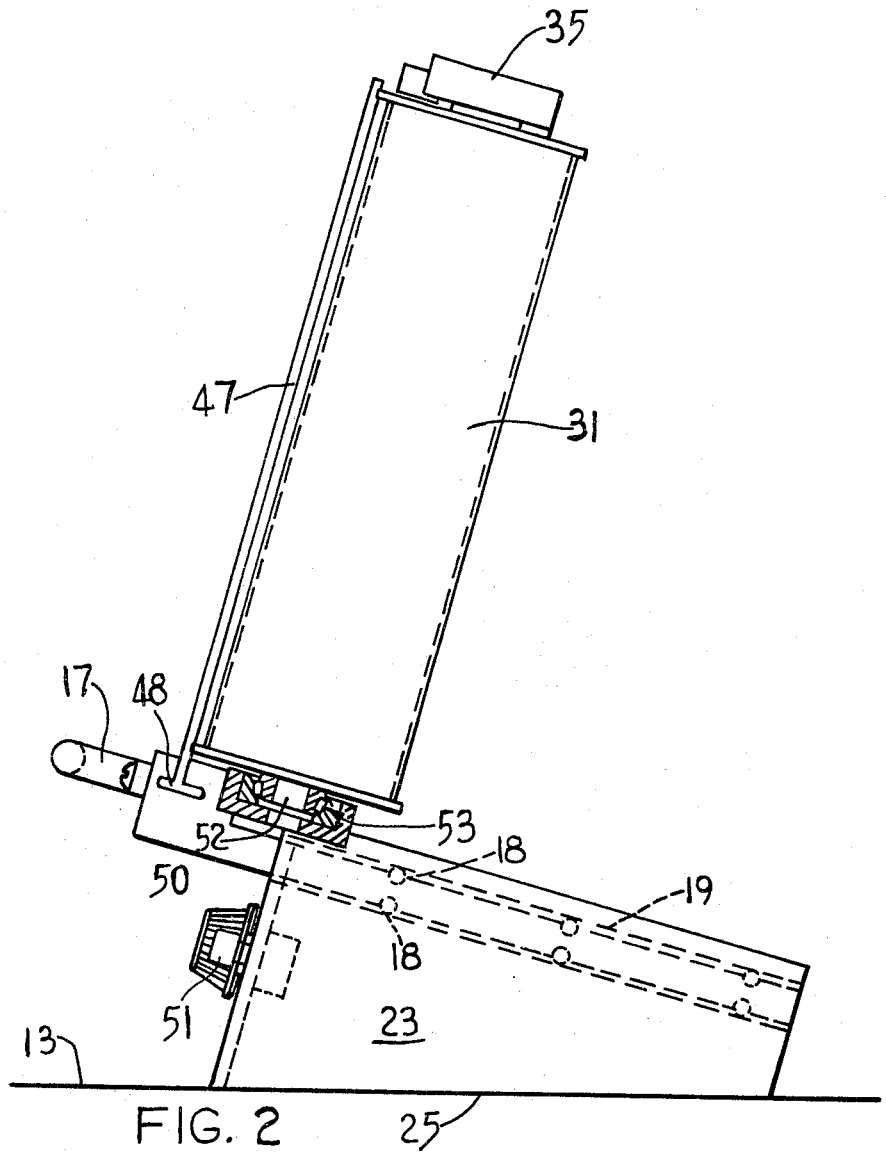
FIGURE 2 illustrates a side elevational view thereof, with the lower bearing of one of the tape rollers cut away to show the bearing mounting.
Figure 3:
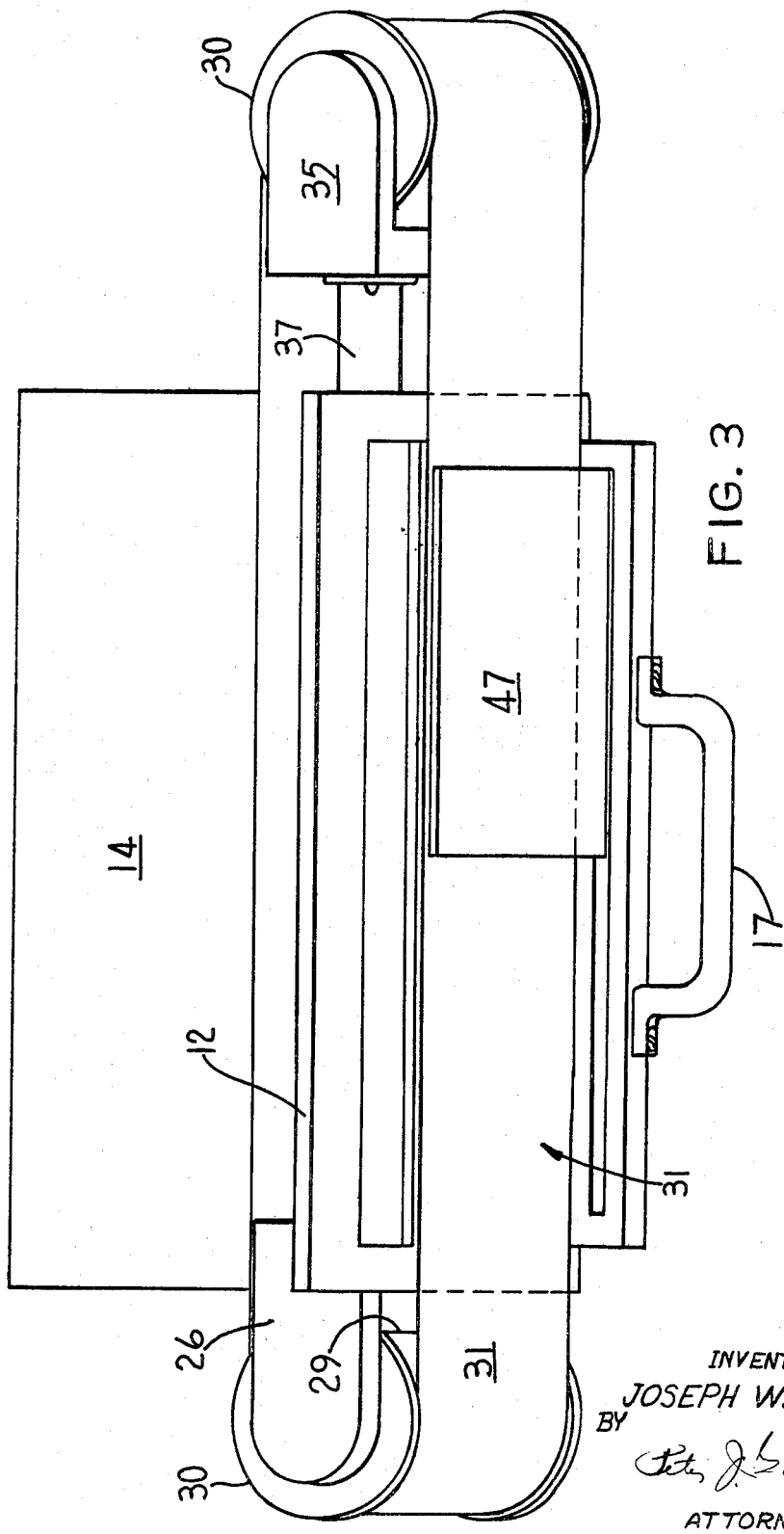
FIGURE 3 presents a top or plan view thereof.
Figure 4:
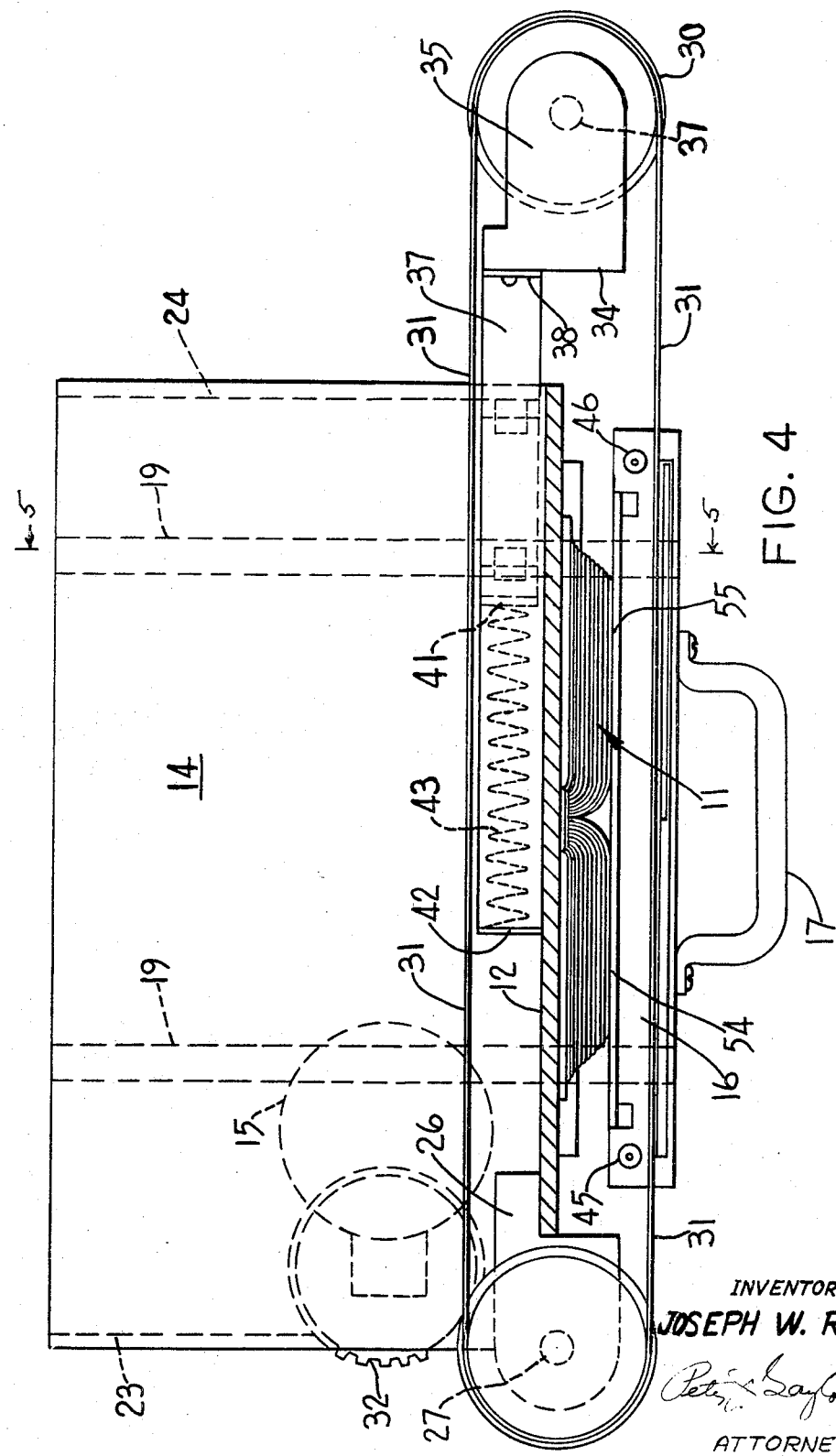
FIGURE 4 shows a vertical top view of the aforesaid unit, as used in reading a page of a book.
Figure 5:
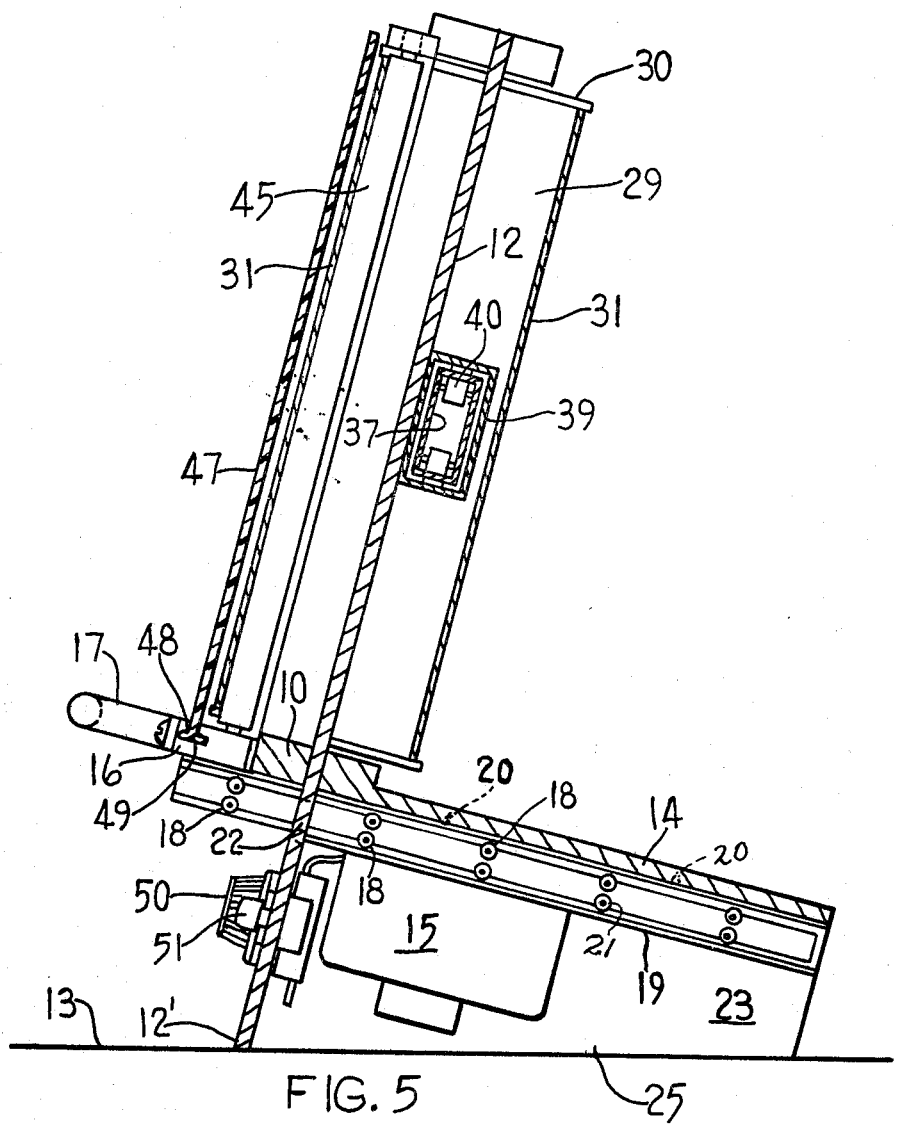
FIGURE 5 depicts a cross-sectional side view taken along the plane of line 5—5 in FIGURE 4.

From FIG. 2, it is seen that rollers 29 and 33 have shafts 52 which are provided with roller bearings 53 for accurate and facile rotation.

When the unit is in use, handle 17 is pulled forwardly, so that idler pulleys or guides 45 and 46 pull tape 31. This causes roller 33 and arm 37 to move leftwardly against the force of spring 43, which operation provides enough room in front of panel 12 for insertion of open book 11, the page 54 of which is to be read. The opposite page 55 of the book is covered with translucent or opaque panel 47.

Then, switch 51 is pressed to start motor 15 which begins rotation of endless tape 31. The reader first uses a low speed to read a line on page 54, as it is gradually uncovered by opaque tape portion 31b. After this portion leaves the line, the reader moves his eyes to read the next line which is beginning to become uncovered by the next opaque tape portion, and so on. When the reader finishes page 54, he then slides opaque panel 47 over it to expose the opposite page 55, and the procedure is repeated. As the reader acquires a more rapid reading technique, the speed of motor 15 is gradually increased. Knob 50 may be provided with a graduated dial 56, which may be marked with speed unit markings 57.

The term "book" employed herein, is considered to include printed sheets, pamphlets, circulars, and the like. The term "opaque" includes translucent materials, which, however, are not as desirable as completely opaque materials.

I claim:

1. A directional attack reading machine, of the type described, comprising:

a vertically-directed mounting panel, a horizontally-directed book base mounted on the forward surface of said panel, below the middle thereof, and designed to enable the placement of an open book thereon, a vertical-axis roller mounted in fixed relation at one side of said mounting panel, a second vertical-axis roller mounted in laterally spring-loaded relation at the other side of said mounting panel, an endless tape disposed over and between both rollers and of width adequate to cover the open pages of said book, and disposed so that one portion between said rollers is movable in the reading direction in front of said book while the other portion is movable behind said mounting panel, said tape being provided with a series of alternating transparent and opaque portions, said transparent portions having substantially at least the dimensions of the reading portion of a page being read, and said opaque portions having substantially the height of said reading portion and from at least a fraction to the full width thereof, a secondary base panel attached in substantially right angle relation to the back of said mounting panel and approximately opposite to said book base, horizontally sliding engagement means attached under said secondary panel and projecting through said mounting panel under said book base, a horizontally-directed support, having a handle, and mounted over the protruding ends of said sliding means in a manner such as to enable pulling said support forwardly while it is in sliding connection with said secondary base panel, a vertically-projecting tape guide disposed on said support near the inner portion of each roller and behind said tape portion disposable in front of said book in a manner such that when said support handle is pulled, said tape guides are able to pull said tape portion against said spring loading, whereby an open book may be inserted on the book base behind said tape portion, an opaque panel slidably mounted on said support in a manner so as to cover one or the other page of said book, and a speed-controllable motor mounted on said secondary base panel and connected in driving relation to said fixed roller.

2. A directional attack reading machine, according to claim 1, in which said second roller is mounted on a yoke, a first sliding means element connected to said yoke, a second larger sliding means element designed to accommodate said first element, and a spring disposed between said first and second elements in a manner so as to impress a thrust upon said first element, said second element being attached to the back of said mounting panel.

(References on following page)

References Cited

UNITED STATES PATENTS

| | | |
|---|---|---|
| 2,715,784 | 8/1955 | Genest. |
| 2,758,393 | 8/1956 | Levy. |
| 3,090,137 | 5/1963 | Asrican. |
| 3,328,898 | 7/1967 | Raba. |

EUGENE R. CAPOZIO, Primary Examiner

W. H. GRIEB, Assistant Examiner